Dec. 29, 1931. L. LAWRASON 1,838,849
TREATER HAVING ROTATABLE LIVE AND GROUNDED ELECTRODES
Filed Aug. 8, 1927 2 Sheets-Sheet 1

INVENTOR:
LEVERING LAWRASON.
BY
ATTORNEY.

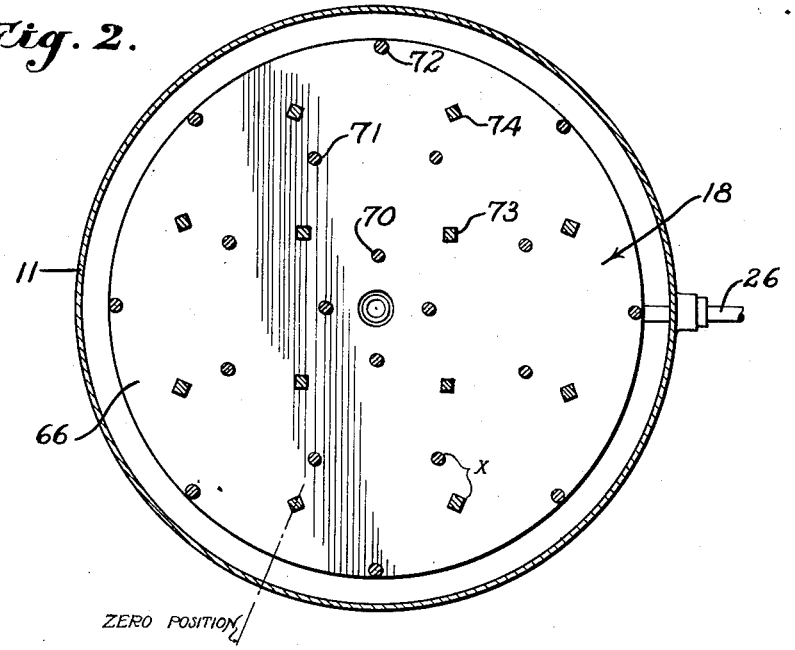
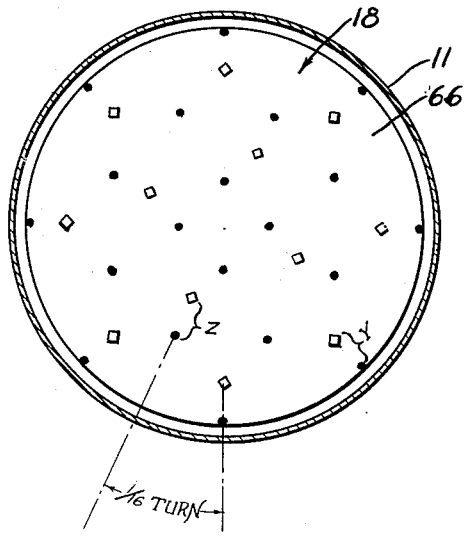
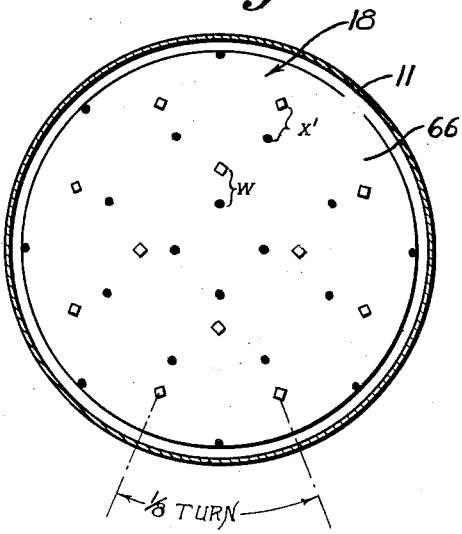

Patented Dec. 29, 1931

1,838,849

UNITED STATES PATENT OFFICE

LEVERING LAWRASON, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

TREATER HAVING ROTATABLE LIVE AND GROUNDED ELECTRODES

Application filed August 8, 1927. Serial No. 211,413.

My invention relates to the art of separating a substance from a fluid.

While my invention is useful in treating many different fluids for separating a substance therefrom, it is particularly useful in separating the phases of an emulsion.

Crude petroleum, as produced from many wells, is in the form of an emulsion with another liquid, which is generally water. The petroleum must be separated out of this emulsion to be commercially valuable. One method in general use for this purpose involves passing the emulsion through an electric field of fairly high potential. Successful operation of this method requires that some means be employed to break up short-circuiting chains of fluid particles that forms in this field as the treatment progresses.

It is an object of my invention to provide a novel process of and apparatus for electrically treating fluids in which the formation of short-circuiting chains is substantially prevented.

In previous methods of treating fluids with an electric field, the field has had a fixed location in the treating space of the fluid treater. I have found that this is a considerable factor in the formation of short-circuiting chains.

It is another object of my invention to provide a novel process of and apparatus for electrically treating fluids in which an electric field in a fluid treating space changes its location frequently during the progress of the treatment.

Other objects and advantages will be made manifest in the following description and in the accompanying drawings in which a preferred embodiment of the apparatus of my invention is illustrated. I will describe the invention with reference to its use in the dehydration of water emulsions of petroleum without limiting myself, however, to this use of the invention.

In the drawings:

Fig. 2 is a horizontal sectional view taken on the line 2—2 of Fig. 1.

Figs. 3 and 4 are similar views to Fig. 2 drawn on a reduced scale for the purpose of illustrating the electrodes of the emulsion treater shown in Fig. 1 in different relative positions.

Figure 1:
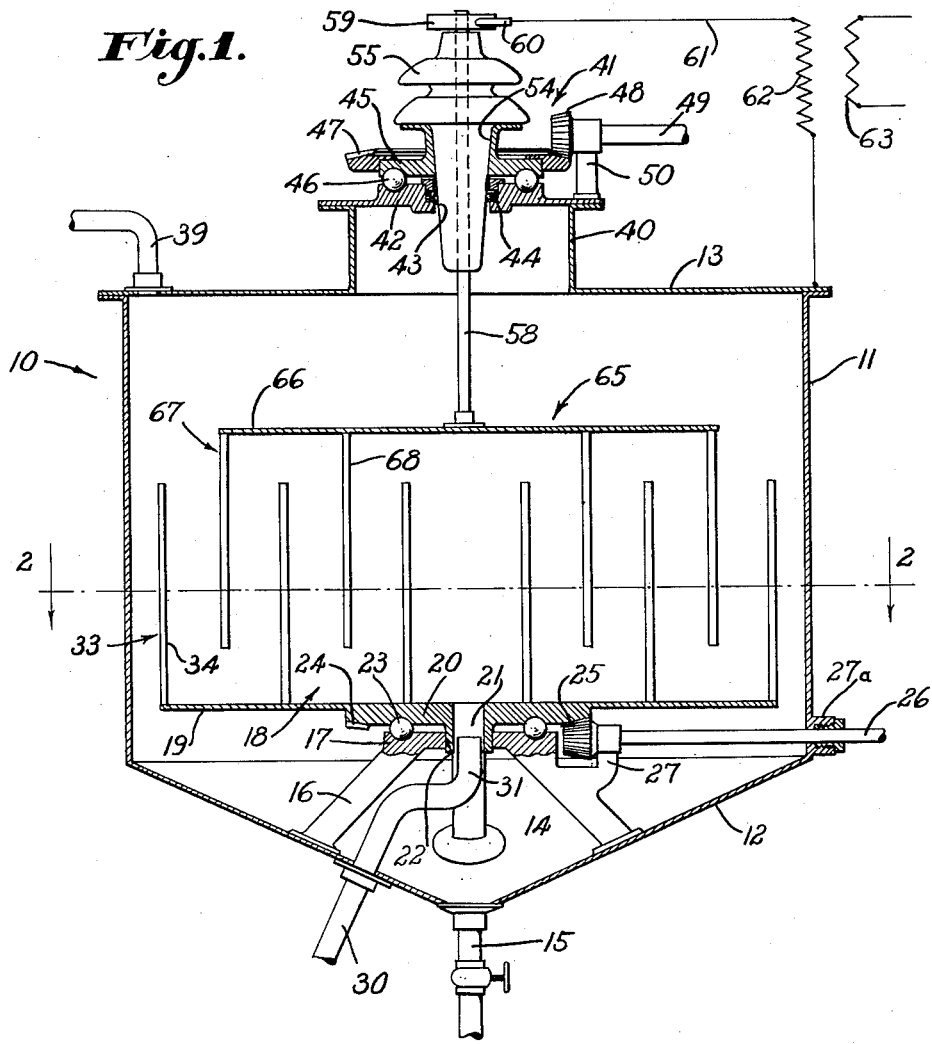
Fig. 1 is a vertical sectional view diagrammatically illustrating the invention.

Referring specifically to the drawings, the apparatus of my invention comprises a treater 10 which includes a cylindrical shell 11 having a conical bottom plate 12 tightly closed at the upper end by a cover-plate 13, these members defining a treating space. The bottom 12 forms a sump space 14 which is drained by a pipe 15 connected with the central portion of the bottom 12. Supported by legs 16 formed integrally therewith and resting upon the bottom 12 is a bearing base 17. Mounted on the bearing base 17 is a grounded electrode 18 which includes a baseplate 19 having a hub 20 from which a tubular stub shaft 21 projects downward into a central opening 22 provided in the bearing base 17. An anti-friction bearing may be formed by the provision of annular ball races in opposite portions of the bearing base 17 and the hub 20, which are adapted to receive balls 23. Provided on the periphery of the hub 20 is a ring gear 24. Meshing with the ring gear 24 is a pinion 25 which is provided on the inner end of a shaft 26 which journals in a bracket 27 formed on one of the legs 16 and passes through a stuffing-box 27a formed in the shell 11. Any suitable means may be provided on the exterior of the shell 11 for rotating the shaft 26 for the purpose of rotating the electrode 18 about the vertical axis.

An emulsion inlet pipe 30 extends upward through the bottom 12 and a terminal portion 31 thereof extends into the tubular stub shaft 21 of the hub 20.

Formed upon the base plate 19 of the grounded electrode 18 is a series 33 of bars 34. The bars 34 are circular in cross-section, as clearly shown in Fig. 2, and extend upward a uniform distance from the plate 19.

Provided in the cover-plate 13 is an oil outlet pipe 39. The cover-plate 13 has a bell 40 which supports a live electrode rotating mechanism 41. The mechanism 41 includes a cap 42 which covers the bell 40 and has a central opening 43 which provides a seat for a packing ring 44. Disposed about the cap 42 in axial alignment with the opening 43 is an insulator supporting member 45. The supporting member 45 and the cap 42 have annular races formed therein which are adapted to receive balls 46 to form an anti-friction bearing between these members. A ring gear 47 is provided on the member 45 and meshed with the ring gear 47 is a pinion 48 which is adapted to be rotated by any suitable means such as a shaft 49 journaled in the bracket 50 which is mounted on the cap 42. A central opening 54 in the supporting member 45 is adapted to receive an insulator 55 which projects downward through the packing ring 44 and the opening 43 into the bell 40.

Extending axially through the insulator 55 is a conductor bar 58, the upper end of which terminates a slight distance above the insulator to receive a contact ring 59 which is engaged by a brush 60. The brush 60 may be electrically energized through a conductor 61 connected to one end of the secondary 62 of a transformer 63, the other end of the secondary 62 being grounded to the shell 11, as shown.

The conductor bar 58 extends downward a short distance into the tank 11 and is centrally connected to and supports a live electrode 65. The electrode 65 includes a baseplate 66 from which a series 67 of elements 68 extend, the elements 68 being formed of metallic rods having an angular cross-section as clearly shown in Fig. 2. The rods 68 extend downward a uniform distance from the plate 66 as shown in Fig. 1.

As an illustration of the method of my invention the operation of the treater 10 may be described as follows:

Before commencing the emulsion treating process the shell 11 is filled with a suitable dielectric fluid which is preferably a grade of petroleum similar to that contained in the emulsion to be treated. The transformer 63 is then energized so as to impose a relatively high potential between the two electrodes 65 and 18. The mechanism which is utilized for the rotation of the shafts 49 and 26 is now placed in motion so as to cause the electrodes 65 and 18 to rotate slowly. In the preferred manner of operating the treater 10 the electrodes will be rotated in the same direction, but one of the electrodes will rotate at a slightly higher speed than the other. As the electrodes rotate, emulsion enters the space therebetween through the pipe 30.

As clearly shown in Fig. 2, the elements 34 of the grounded electrode 18 are disposed in three concentric series 70, 71 and 72 while the elements 68 are disposed in two concentric series 73 and 74. As the electrodes 18 and 65 are co-axially aligned with each other, the series 73 and 74 are concentric with the series 70, 71 and 72. The series 70 includes four elements 34. The series 71 and 72 each have eight elements 34. The series 73 has four elements 68, and the series 74 has eight elements 68. The elements of each series are equally spaced about the axis of the electrodes. The series 73 is of such radius as to be disposed equidistant between the series 70 and the series 71, while the series 74 is of such radius as to be disposed equidistant between the series 71 and the series 72.

For the purpose of explaining the operation of the treater 10 the relative position of the elements 68 and 34, as shown in Fig. 2, will be considered the beginning or zero position of these elements. Due to the potential imposed between the electrodes 65 and 18 a relatively high field will be set up between corresponding elements of the series 71 and 74, as indicated by the bracket $x$. Figs. 3 and 4 as previously described, are similar to Fig. 2, and for the purpose of simplifying the explanation, the electrode 18 is shown in the same position in each of Figs. 2, 3, and 4, while in actual operation the position of this electrode would be continually changing. The only movement indicated in these figures is of the elements 68 of the electrode 65.

Fig. 3 shows the position of the elements 68 when the electrodes 65 shall have made a one-sixteenth turn relative to the electrode 18 from the relative position in which these electrodes are shown in Fig. 2. The one-sixteenth turn illustrated in Fig. 3 moves the series 74 out of adjacency with the series 71 and into adjacency with the series 72; thus fields of relatively high potential will be set up between the series 74 and series 72 as indicated by the bracket $y$. At the same time the series 73 will be brought into adjacency with the series 71 so as to set up fields of relatively high potential as indicated by the bracket $z$. In Fig. 4 the electrode 65 is shown as having made a one-eighth turn from zero position relative to the electrode 18. Here it is seen that the series 74 has again moved into adjacency with the series 71 to set up fields of relatively high potential as indicated by the bracket $x'$. At the same time the series 73 has moved into adjacency with the series 70 so as to set up fields of relatively high potential indicated by the bracket $w$. It is thus seen that in the progress of the treating process that a field is set up alternately on opposite sides of each of the square bars 68 during each one-eighth turn of the electrodes relative to each other. Thus as the emulsion passes from a central position between the electrodes and moves toward their peripheries, it is successively subjected to treatment by electric fields of varying strength which are maintained at peak potential for but an instant. As the emulsion passes radially beyond the outermost of these fields, the water is sufficiently agglomerated to settle downward, passing between the shell 11 and the plate 19 into the sump 14 from which it is drawn off from time to time through the pipe 15.

Owing to its relative lightness, the oil freed from the emulsion rises to the top of the tank and is drawn off through the pipe 39.

I claim as my invention:

1. A method of treating fluids electrically which comprises: passing said fluid through a treating space; building up a primary electric field of high intensity between electrode elements in one part of said treating space; reducing the intensity of said primary field; and setting up a secondary electric field of high intensity between different electrode elements in a different portion of said treating space and while the intensity of said primary field is reduced.

2. In a fluid treater, the combination of: a primary electrode having two series of elements thereon, the elements of one series being radially disaligned from the elements of the other series; a secondary electrode having a series of elements positioned between said two series of elements on said primary electrode, each of these elements alternately cooperating with the elements of said two series of elements on said primary electrode in establishing successive electric fields; and means for moving one of said electrodes relative to the other.

3. In a fluid treater, the combination of: a primary electrode electrically connected to a source of electromotive force; and means electrically connected to said source and including a secondary electrode for alternately establishing electric fields on opposite sides of said primary electrode, said means including a drive means for rotating one of said electrodes relative to the other.

4. In a fluid treater, the combination of: a primary electrode comprising a plurality of parallel bars thereon, said bars being arranged in two concentric series; a secondary electrode comprising a plurality of bars parallel to said bars on said primary electrode and extending between said two series of bars; and means for rotating one of said electrodes relative to the other.

5. A combination as defined in claim 4 in which said bars of said two series are non-radially disposed relative to each other.

6. In a fluid treater, the combination of: primary and secondary electrodes having bars thereon, the bars on one electrode being formed in a plurality of series concentric with a plurality of series of bars on the other; means for establishing a difference in potential between said electrodes, said bars on said electrodes being relatively positioned in such a manner that a relative rotation of said electrodes causes electric fields to be successively built up between different pairs of said bars; and means for causing a relative rotation of said electrodes.

7. In combination: a primary electrode comprising a primary base plate and a plurality of bars extending therefrom; a secondary electrode comprising a secondary base plate parallel to said primary base plate and having a plurality of bars extending therefrom and interspaced with bars of said primary electrode; and means for introducing a fluid to be treated into the space between said base plates.

8. In an electric treater, the combination of: a pair of electrodes; means for establishing an electric field between said electrodes; and means for rotating each of said electrodes in the same direction and at differential speeds.

9. A method of treating a fluid electrically which consists in passing said fluid through a treating space in substantially a radial direction, and successively setting up electric fields at different radial positions in said treating space.

10. A method of treating a fluid electrically which consists in building up an electric field at one radial distance from a given axis passing through said fluid, and very shortly thereafter building up another electric field at a different radial distance from said axis.

11. A method of treating a fluid electrically which consists in building up an electric field at one radial distance from a given axis passing through said fluid and in a given direction therefrom, and very shortly thereafter building up another electric field at a different radial distance and in a direction different from said given direction from said axis.

12. A method of treating a fluid electrically which comprises passing said fluid through a treating space from the center toward the periphery thereof, setting up an electric field in said treating space at one radial distance from said center thereof, and subsequently setting up another electric field in another portion of said treating space which lies at a different radial distance from said center thereof.

13. A method of treating a fluid electrically which comprises passing said fluid through a treating space from the center toward the periphery thereof, setting up an electric field in said treating space at one radial distance from said center thereof and in a given direction therefrom, and subsequently setting up another electric field in another portion of said treating space which lies at a different radial distance from said center thereof and in a direction different from said given direction.

14. In an electric treater, the combination of: a pair of electrodes defining a treating space and each providing prominent portions; means for establishing an electric field between said electrodes, said field being most intense adjacent those prominent portions of said electrodes which lie closest together at any period of time; and means for rotating each of said electrodes whereby the most intense portions of said field are successively built up in different parts of said treating space.

15. In an electric treater, the combination of: a primary electrode providing bars; a secondary electrode cooperating with said primary electrode in defining a treating space, said secondary electrode providing bars extending adjacent the bars of said primary electrode and parallel thereto; and means for rotating each of said electrodes whereby the bars of said electrodes successively set up high intensity fields in different parts of said treating space.

In testimony whereof, I have hereunto set my hand at Los Angeles, California, this 2nd day of August, 1927.

LEVERING LAWRASON.